(12) United States Patent
Fitzpatrick (10) Patent No.: US 12,012,025 B2
(45) Date of Patent: Jun. 18, 2024

(54) OCCUPANT SUPPORT AND VEHICLE WITH OCCUPANT SUPPORT

(71) Applicant: Faurecia Automotive Seating, LLC, Auburn Hills, MI (US)

(72) Inventor: Robert C. Fitzpatrick, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 93 days.

(21) Appl. No.: 17/718,655

(22) Filed: Apr. 12, 2022

(65) Prior Publication Data

US 2023/0322140 A1 Oct. 12, 2023

(51) Int. Cl.
*B60N 2/90* (2018.01)

(52) U.S. Cl.
CPC ........ *B60N 2/976* (2018.02); *B60N 2002/981* (2018.02)

(58) Field of Classification Search
CPC ... B60N 2/914; B60N 2002/981; B60N 2/976
See application file for complete search history.

(56) References Cited

U.S. PATENT DOCUMENTS

| | | | |
|---|---|---|---|
| 7,727,171 B2 | 6/2010 | Ozaki | |
| 10,752,145 B2 | 8/2020 | Steinberger | |
| 11,046,225 B2 | 6/2021 | Mergl | |
| 2007/0068720 A1 | 3/2007 | Fischer | |
| 2007/0241595 A1 | 10/2007 | Nathan | |
| 2009/0146470 A1 | 6/2009 | Thompson | |
| 2015/0197173 A1 | 7/2015 | Hulway | |
| 2016/0354027 A1 | 12/2016 | Benson | |
| 2018/0065517 A1* | 3/2018 | Kuhley | A61H 23/02 |
| 2018/0147964 A1 | 5/2018 | Ogiso | |
| 2019/0353184 A1* | 11/2019 | Uno | B60N 2/5657 |
| 2020/0238854 A1 | 7/2020 | Gandhi | |
| 2021/0300224 A1 | 9/2021 | Tait | |

FOREIGN PATENT DOCUMENTS

| | | | |
|---|---|---|---|
| DE | 102014002942 A1 | 9/2015 | |
| DE | 102019115348 A1 | 12/2020 | |
| EP | 2006152 A2 * | 12/2008 | ........... B60N 2/4415 |
| EP | 3319834 B1 | 8/2021 | |

OTHER PUBLICATIONS

International (PCT) Search Report and Written Opinion for PCT/US23/17552 mailed Jun. 21, 2023, IDFAUH21047 PCT II (47631-386709), 11 pages.

* cited by examiner

*Primary Examiner* — Milton Nelson, Jr.
(74) *Attorney, Agent, or Firm* — Barnes & Thornburg LLP (57) ABSTRACT

An occupant support for a vehicle includes a device configured to enhance comfort and experience of an occupant while the occupant is using the occupant support.

19 Claims, 5 Drawing Sheets

OCCUPANT SUPPORT AND VEHICLE WITH OCCUPANT SUPPORT

BACKGROUND

The present disclosure relates to a vehicle, and particularly to a vehicle with an occupant support. More particularly, the present disclosure relates to an occupant support having a device to enhance comfort and an occupant's experience while using the occupant support.

SUMMARY

According to the present disclosure, a vehicle in accordance with the present disclosure includes an occupant support configured to support an occupant of the vehicle. The occupant support includes a trim cover and a foam cushion underlying the trim cover. The trim cover surrounds the foam cushion to provide an outer surface of the occupant support and may include at least one of cloth, leather, synthetic leather, or any other suitable material. The foam cushion underlies the trim cover and includes a foamed cushioning material to increase comfort for the occupant seated on the occupant support.

In illustrative embodiments, the occupant support further includes an occupant-support pulse unit. The occupant-support pulse unit is operable in a plurality of modes including a massage mode, a haptic feedback mode, and a music sync mode. Each of the plurality of modes of the occupant-support pulse unit provides a different function for the occupant-support pulse unit to enhance comfort and the occupant's experience while using the occupant support.

In illustrative embodiments, the occupant-support pulse unit includes a housing, a plurality of dielectric actuators, and an electronic system. The housing is positioned between the trim cover and the foam cushion. The plurality of dielectric actuators are positioned within the housing. The electronic system operates the plurality of dielectric actuators to execute the plurality of functions of the occupant-support pulse unit.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
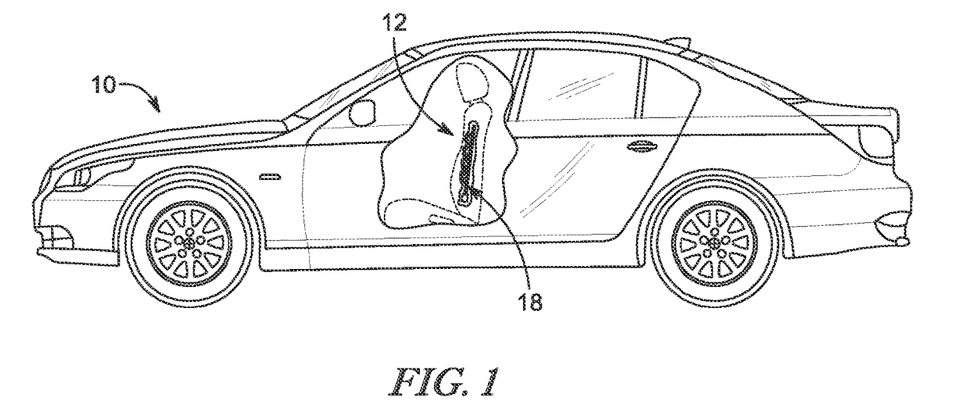
FIG. 1 is a side elevation and diagrammatic view of a vehicle with portions cut away to show that the vehicle includes an occupant support including an occupant-support pulse unit operable in a plurality of modes including a massage mode, a haptic feedback mode, and a music sync mode to enhance comfort and the occupant's experience while using the occupant support.
Figures 2, 3:
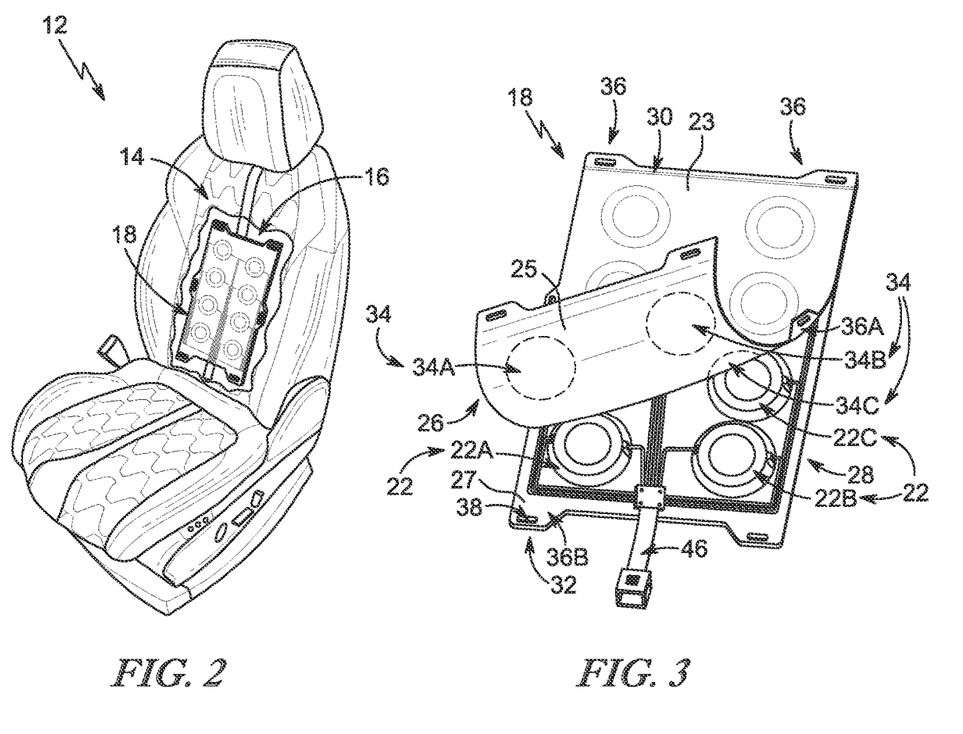
FIG. 2 is a perspective view of the occupant support of FIG. 1 with portions cut away to show that the occupant support includes a trim cover, a foam cushion, and the occupant-support pulse unit.
FIG. 3 is a perspective view of the occupant-support pulse unit of FIG. 1 including a housing having a top housing-substrate layer, a base housing-substrate layer, a layer bonding system defining a plurality of actuator-receiving pockets and a plurality of dielectric actuators arranged to lie between the top housing-substrate layer and the base housing-substrate layer.

A vehicle 10 in accordance with the present disclosure includes an occupant support 12 as shown in FIGS. 1 and 2. The occupant support 12 is configured to support an occupant 11 of the vehicle, for example, and includes a trim cover 14, a foam cushion 16 underlying the trim cover 14, and an occupant-support pulse unit 18. The occupant-support pulse unit 18 is operable in a plurality of modes including a massage mode, a haptic feedback mode, and a music sync mode. Each of the plurality of modes of the occupant-support pulse unit 18 provides a different function for the occupant-support pulse unit 18 to enhance comfort and the occupant's 11 experience while using the occupant support 12.

Figure 6:
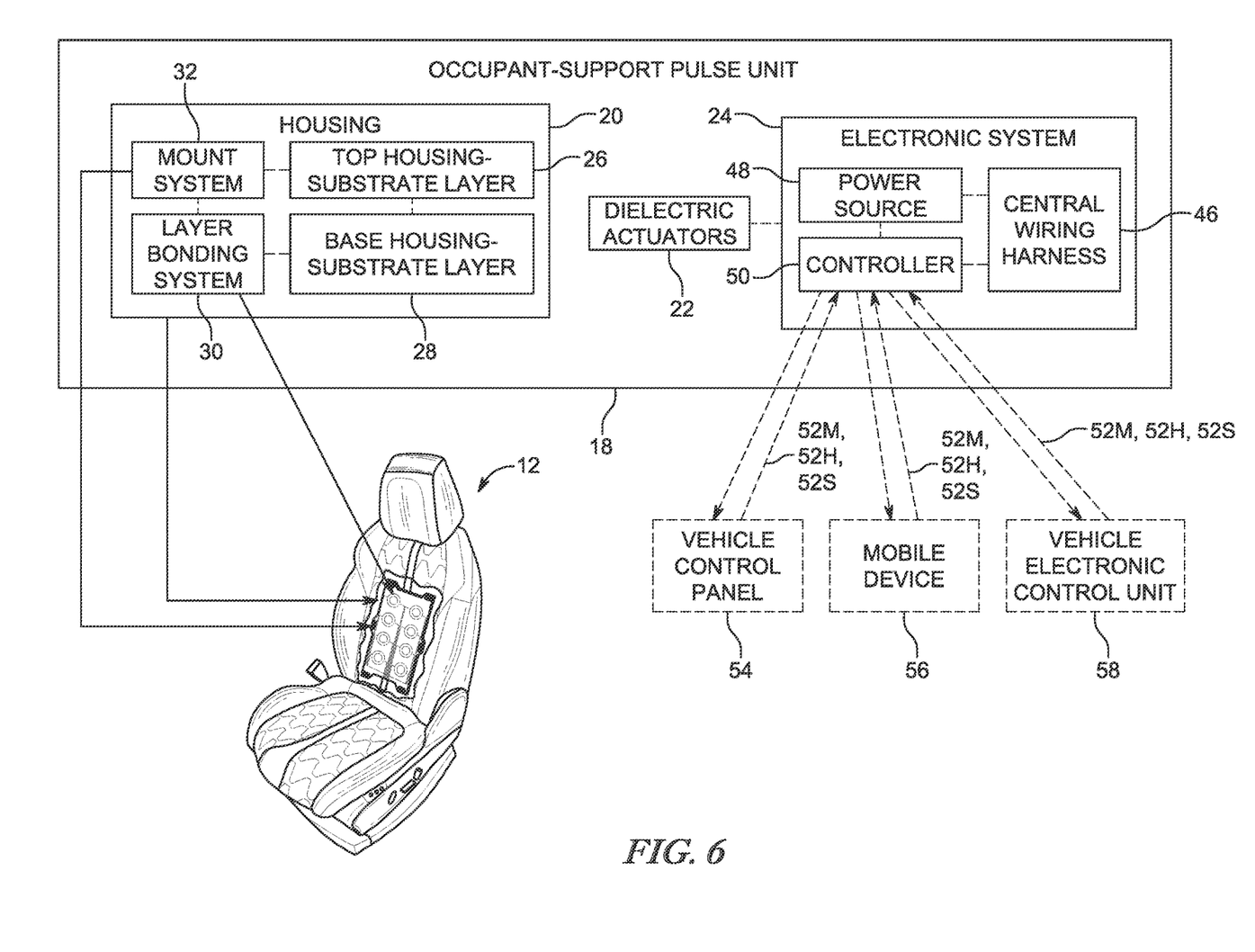
FIG. 6 is a diagrammatic view of the occupant-support pulse unit of FIG. 1 showing that the occupant-support pulse unit further includes an electronic system including a central wiring harness coupled to each of the dielectric actuators, a power source, and a controller connected to the central wiring harness and configured to control operation of the plurality of dielectric actuators to provide at least one of the modes in response to an input from at least one of a vehicle control panel, a mobile device, and a vehicle electronic control unit.

The occupant-support pulse unit 18 includes a housing 20, a plurality of dielectric actuators 22, and an electronic system 24 as shown in FIGS. 3 and 6. The housing 20 is positioned between the trim cover 14 and the foam cushion 16. The plurality of dielectric actuators 22 are positioned within the housing 20. The electronic system 24 operates the plurality of dielectric actuators 22 to execute the plurality of functions of the occupant-support pulse unit 18.

The housing 20 includes a top housing-substrate layer 26, a base housing-substrate layer 28, a layer bonding system 30, and a mount system 32 as shown in FIGS. 3 and 6. The top housing-substrate layer 26 is arranged in confronting relation to and contacts the trim cover 14. The base housing-substrate layer 28 is arranged in confronting relation to and contacts the foam cushion 16 so that the base housing-substrate layer 28 is positioned between the top housing-substrate layer 26 and the foam cushion 16. The layer bonding system 30 retains the top housing-substrate layer 26 to the base housing-substrate layer 28 and defines a plurality of actuator receiving pockets 34 between the top housing-substrate layer 26 and the base housing-substrate layer 28. The mount system 32 is coupled to both the top housing-substrate layer 26 and the base housing-substrate layer 28 and is configured to secure the housing 20 to the occupant support 12.

Figure 4:
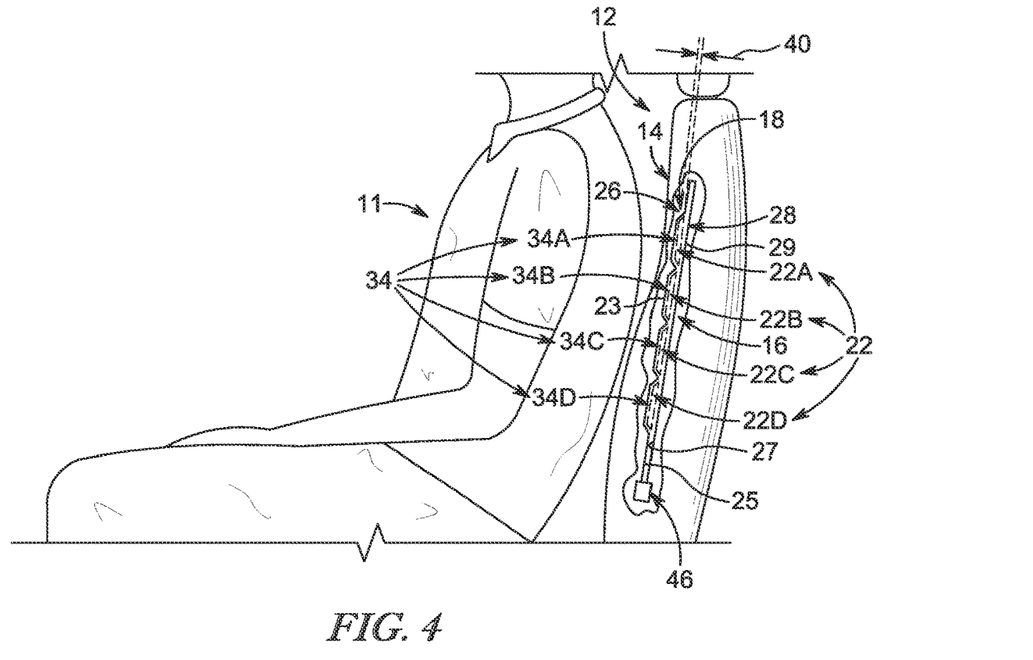
FIG. 4 is a side elevation and diagrammatic view of the occupant support of FIG. 1 with portions cut away showing an occupant seated on the occupant support where each of the dielectric actuators of the plurality of dielectric actuators in an inactive state.
Figure 5:
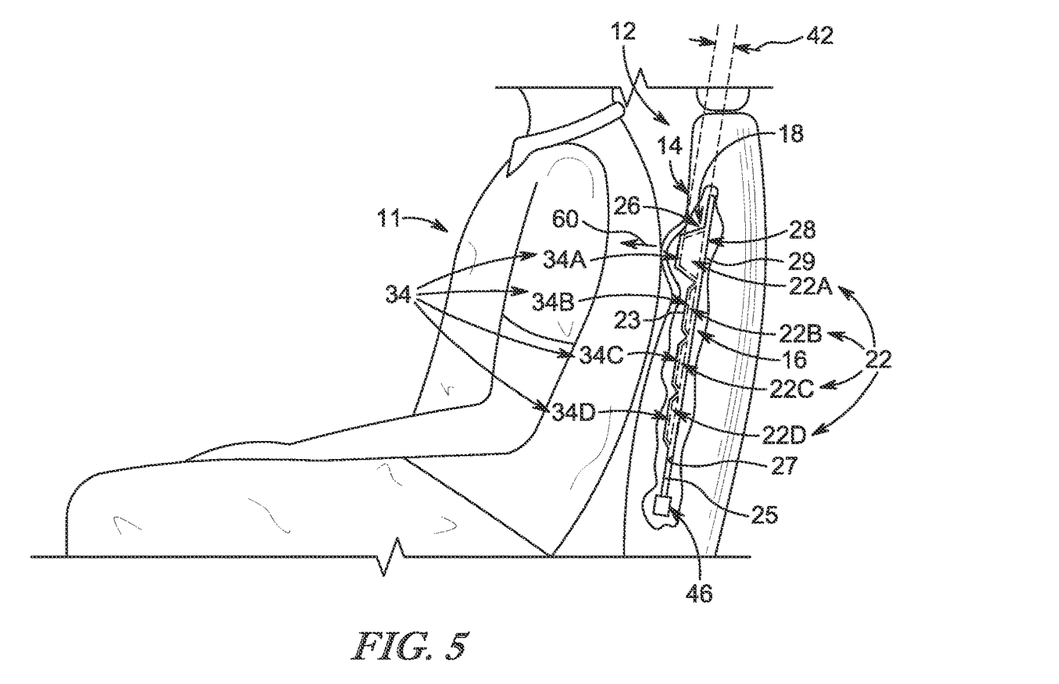
FIG. 5 is a side elevation and diagrammatic view similar to FIG. 4 showing one dielectric actuator of the plurality of dielectric actuators in an active state where a thickness of the dielectric actuator increases to protrude outwardly towards the occupant seated on the occupant support and provide one of the modes.

The top housing-substrate layer 26 includes a front surface 23 facing the occupant 11 while the base housing-substrate layer 28 has a back surface 29 facing away from the occupant 11 as shown in FIGS. 4-5. The base housing-substrate layer 28 also includes a front surface 27 located between a back surface 25 of the top housing-substrate layer 26 and the back surface 29 of the base housing-substrate layer 28. The top housing-substrate layer 26 and the base housing-substrate layer 28 are each made of flexible materials. In some embodiments, the top housing-substrate layer 26 is made of the same flexible material as the base housing-substrate layer 28. In other embodiments, the top housing-substrate layer 26 is made of a more flexible material than the base housing-substrate layer 28. In alternative embodiments, the top housing-substrate layer 26 is made of a less flexible material than the base housing-substrate layer 28. The flexible material may be a nonwoven fabric.

In the illustrative embodiment, the layer bonding system 30 retains the top housing-substrate layer 26 to the base housing-substrate layer 28 and defines the plurality of actuator receiving pockets 34 with stitching. The stitching between the top housing-substrate layer 26 and the base housing-substrate layer 28 may extend along the entire perimeter of both the top housing substrate-layer 26 and the base housing-substrate layer 28, or the stitching may extend along only a portion of the perimeter of both the top housing substrate-layer 26 and the base housing-substrate layer 28. The stitching also extends around each dielectric actuator 22 to define each individual pocket 34 and locate each dielectric actuator 22 in a respective pocket 34. In other embodiments, the layer bonding system 30 may retain the top-housing substrate layer 26 to the base housing-substrate layer 28 and define the plurality of actuator receiving pockets 34 by fusing or gluing the top housing-substrate layer 26 to the base housing-substrate layer 28. In some embodiments, the layer bonding system 30 may retain the top-housing substrate layer 26 to the base housing-substrate layer 28 and define the plurality of actuator receiving pockets 34 with a combination of stitching, fusing, or gluing the top housing-substrate layer 26 to the base housing-substrate layer 28.

The mount system 32 includes a plurality of tabs 36. The tabs 36 extend outwardly away from both the top housing-substrate layer 26 and the base housing-substrate layer 28. The tabs 36 may each include an aperture 38 which is configured to receive a fastener (not shown) to secure the housing 20 to the occupant support 12. In the illustrative embodiment, the tabs 36 include a plurality of tabs 36A coupled to the top housing-substrate layer 26 and a plurality of companion tabs 36B coupled to the base housing-substrate layer 28. In other embodiments, the tabs 36 may be only be coupled to the top housing-substrate layer 26 or the base housing-substrate layer 28. In some embodiments, the tabs 36A on the top housing-substrate layer 26 may not all have companion tabs 36B on the base housing-substrate layer 28. The fastener may be tape, glue, stitching, one or more straps, one or more zip ties, one or more plastic insert tabs, one or more hog rings, or any combination of fasteners suitable to secure the housing 20 to the trim cover 14 and/or the foam cushion 16 of the occupant support 12.

The plurality of dielectric actuators 22 includes dielectric actuators 22A, 22B, 22C, 22D as shown in FIGS. 3-5. Each dielectric actuator 22A, 22B, 22C, 22D is received in a corresponding actuator-receiving pocket 34A, 34B, 34C of the plurality of actuator-receiving pockets 34. Each dielectric actuator 22A, 22B, 22C, 22D is changeable between an inactive state in which each dielectric actuator 22A, 22B, 22C, 22D has a first thickness 40 and an active state in which each dielectric actuator 22A, 22B, 22C, 22D expands to a second thickness 42 greater than the first thickness 40. The first thickness 40 and the second thickness 42 are defined between the base housing-substrate layer 28 and the top housing-substrate layer 26. In the active state of each dielectric actuator 22A, 22B, 22C, 22D, at least a portion of the trim cover 14 moves toward the occupant 11 seated in the occupant support 12 so that the occupant 11 receives a force 60 from each dielectric actuator 22A, 22B, 22C, 22D in the active state as shown in FIG. 5. In some embodiments, a stack of two or more dielectric actuators 22 may be received in one or more actuator-receiving pockets 34. In such embodiments, each dielectric actuator 22 of each stack may be independently changeable between the inactive state and the active state, or all dielectric actuators 22 in each stack may be configured to be collectively changeable between the inactive state or the active state.

The plurality of dielectric actuators 22 may be HASEL (hydraulically amplified, self-healing, electrostatic) actuators. A HASEL actuator includes a deformable shell made of a flexible material and two or more opposing electrodes covering the deformable shell. The deformable shell is filled with liquid dielectric. When voltage is applied to the two or more opposing electrodes, a Maxwell stress acts on the shell and the liquid dielectric, causing the liquid dielectric to locally redistribute and therefore change the shape of the deformable shell. Thus, in the illustrative embodiment, the active state of each dielectric actuator 22A, 22B, 22C of the plurality of dielectric actuators 22 is the result of the liquid dielectric changing the shape of the deformable shell and thereby defining the second thickness 42 of each dielectric actuator 22A, 22B, 22C. In other embodiments, the plurality of dielectric actuators 22 may be different types of dielectric actuators, or a combination of HASEL actuators and other types of dielectric actuators.

The electronic system 24 includes a central wiring harness 46, a power source 48, and a controller 50 as shown in FIG. 6. The central wiring harness 46 is coupled to each dielectric actuator 22A, 22B, 22C of the plurality of dielectric actuators 22. The power source 48 provides electricity to the central wiring harness 46 to selectively change each dielectric actuator to the active state. The controller 50 includes a processor and a memory storage device (not shown). The processor executes instructions stored on the memory storage device. The memory storage device of the controller 50 includes instructions that output a command signal to the central wiring harness 46 in response to one or more inputs 52M, 52H, 52S to cause at least one dielectric actuator 22A, 22B, 22C to change to the active state. Each of the dielectric actuators 22 is individually actuatable by the controller 50 separately from one another. In the illustrative embodiment, the controller 50 is coupled to and receives inputs from a control panel 54 of the vehicle 10, a mobile device 56, and/or an electronic control unit 58 of the vehicle 10. In some embodiments, the controller 50 may be the electronic control unit 58 of the vehicle 10.

The massage function of the occupant-support pulse unit 18 occurs when a massage input 52M is received by the controller 50 from at least one of the control panel 54, the mobile device 56, and/or the electronic control unit 58. In response to receiving the massage input 52M, the processor executes instructions stored on the memory storage device to change the plurality of dielectric actuators 22 from the inactive state to the active state in a massage mode. In the massage mode of the plurality of dielectric actuators 22, electricity is transferred from the power source 48 to at least one dielectric actuator 22A, 22B, 22C through the central wiring harness 46 to cause the plurality of dielectric actuators 22 to change to the active state in a repeated pattern, thereby providing massaging effects to the occupant 11. By way of example, the massage mode may change two dielectric actuators 22A, 22B to the active state simultaneously, and then change one different dielectric actuator 22C to the active state while changing the two dielectric actuators 22A, 22B to the inactive state. In some embodiments, the user 11 may edit the massage input 52M or select a predetermined massage pattern stored in the memory storage device with the control panel 54 and/or the mobile device 56 to adjust the massage mode of the plurality of dielectric actuators 22. Therefore, any desired pattern of changing the plurality of dielectric actuators 22 to the active state may be achieved in the massage mode to provide a unique massage to the user 11.

The haptic feedback function of the occupant-support pulse unit 18 occurs when a haptic feedback input 52H is received by the controller 50 from at least one of the control panel 54, the mobile device 56, and/or the electronic control unit 58. In response to receiving the haptic feedback input 52H, the processor executes instructions stored on the memory storage device to change at least one dielectric actuator 22A, 22B, 22C, 22D of the plurality of dielectric actuators 22 from the inactive state to the active state in a haptic feedback mode. In the haptic feedback mode of the plurality of dielectric actuators 22, electricity is transferred from the power source 48 to the at least one dielectric actuator 22A, 22B, 22C, 22D through the central wiring harness 46 to cause the at least one dielectric actuator 22A, 22B, 22C, 22D to change to the active state in a second repeated pattern. The second repeated pattern is different than the repeated pattern of the massage mode. In the illustrative embodiment, the haptic feedback input 52H is delivered to the controller 50 in response to an event on the control panel 54, the mobile device 56, and or the electronic control unit 58. By way of example, the haptic feedback mode may change the at least one dielectric actuator 22A, 22B, 22C, 22D to the active state when the mobile device receives a notification. The haptic feedback input 52H may be delivered to the controller 50 in response to a signal provided by a sensor (not shown) that is in communication with the controller 50, such as when the controller 50 is the electronic control unit 58. For example, the haptic feedback mode may change the at least one dielectric actuator 22A, 22B, 22C, 22D to the active state when a lane departure camera in communication with the electronic control unit 58 (also the controller 50) detects the vehicle 10 departing a vehicle lane on a road. In some embodiments, the user 11 may edit the haptic feedback input 52H with the control panel 54 and/or the mobile device 56 to adjust the haptic feedback mode of the plurality of dielectric actuators 22, such as choosing not to receive haptic feedback from the plurality of dielectric actuators 22 when the mobile device 11 receives a text message.

The music sync function of the occupant-support pulse unit 18 occurs when a music sync input 52S is received by the controller 50 from at least one of the control panel 54, the mobile device 56, and/or the electronic control unit 58. In response to receiving the music sync input 52S, the processor executes instructions stored on the memory storage device to change the plurality of dielectric actuators 22 from the inactive state to the active state in a music sync mode. In the music sync mode of the plurality of dielectric actuators 22, electricity is transferred from the power source 48 to at least one dielectric actuator 22A, 22B, 22C, 22D through the central wiring harness 46 to cause the plurality of dielectric actuators 22 to change to the active state in a third repeated pattern. The third repeated pattern is different that the repeated pattern of the massage mode and the second repeated pattern of the haptic feedback mode. In the illustrative embodiment, the music sync input 52S is delivered to the controller 50 in response to music played on the mobile device 56 and/or a stereo system (not shown) in communication with the electronic control unit 58. By way of example, the music sync mode may change the plurality of dielectric actuators 22 to the active state in sync with the music. In some embodiments, the user 11 may edit the music sync input 52S with the control panel 54 and/or the mobile device 56 to adjust the music sync mode of the plurality of dielectric actuators 22.

In some embodiments, the controller 50 may be configured to operate the plurality of dielectric actuators 22 in the haptic feedback mode at the same time as the massage mode. Therefore, the plurality of dielectric actuators 22 may provide the repeated pattern of the massage mode and the second repeated pattern of the haptic feedback mode at the same time. Likewise, in other embodiments, the controller 50 may be configured to operate the plurality of dielectric actuators 22 in the haptic feedback mode at the same time as the massage mode and/or the music sync mode. Therefore, the plurality of dielectric actuators 22 may provide the second repeated pattern of the haptic feedback mode at the same time as the repeated pattern of the massage mode and/or the third repeated pattern of the music sync mode. For example, in an embodiment where at least one actuator receiving pocket 34A receives a stack of two or more dielectric actuators, a first dielectric actuator in the stack may provide the first repeated pattern of the massage mode so that the occupant 11 receives a first force from the stack. A second dielectric actuator in the stack may provide the second repeated pattern of the haptic feedback mode so that the occupant 11 receives a second, greater force from the stack.

In some embodiments, at least one dielectric actuator 22A included in the plurality of dielectric actuators 22 may be designated only for the massage function of the occupant-support pulse unit 18. Similarly, at least one separate dielectric actuator 22B included in the plurality of dielectric actuators 22 may be designated only for the haptic feedback function, while at least one additional dielectric actuator 22C included in the plurality of dielectric actuators 22 may be designated only for the music sync function. In other embodiments, at least one dielectric actuator 22A may be designated for both the massage function and the music sync function of the occupant-support pulse unit 18 while at least one separate dielectric actuator 22B may be designated for only the haptic feedback function.

The occupant-support pulse unit may only have the massage function, the haptic feedback function, or the music sync function. In other embodiments, the occupant-support pulse unit may have any combination of the massage function, the haptic feedback function, or the music sync function.

Figure 7:
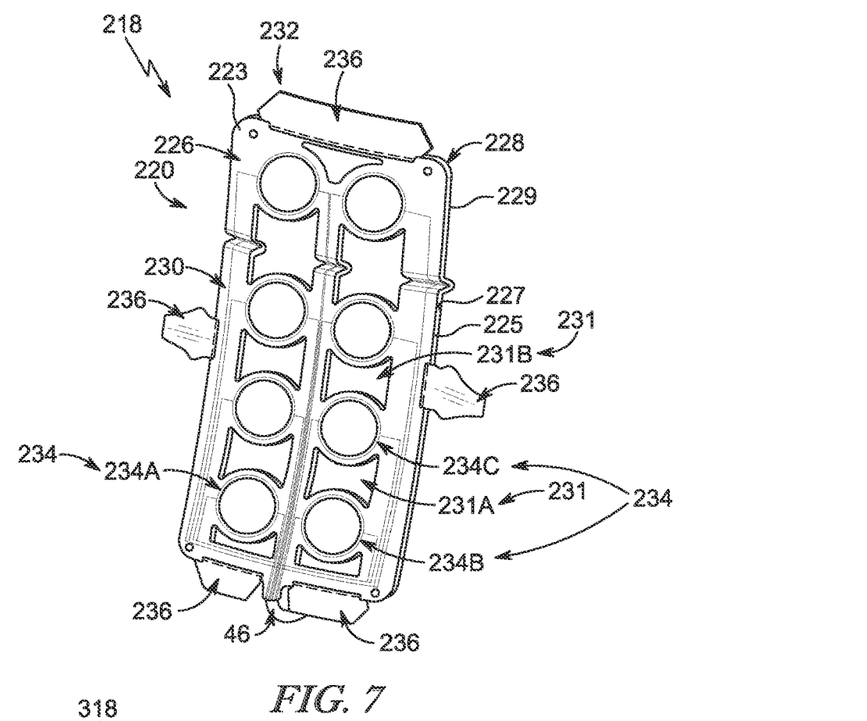
FIG. 7 is a perspective view of a second embodiment of an occupant-support pulse unit showing a housing having a top housing layer, a base housing layer, a layer bonding system defining a plurality of actuator-receiving pockets, a mount system having tabs extending outwardly away from the housing that secure the housing to an occupant support and a plurality of dielectric actuators arranged to lie between the top housing layer and the base housing layer.

A second embodiment of an occupant-support pulse unit 218 is shown in FIG. 7. The occupant-support pulse unit 218 is substantially similar to the occupant-support pulse unit 18. Accordingly, the disclosure of the occupant-support pulse unit 18 is incorporated by reference for the occupant-support pulse unit 218 except for the differences explicitly described below.

The occupant-support pulse unit 218 includes a housing 220. The housing 220 includes a top housing layer 226, a base housing layer 228, a layer bonding system 230, and a mount system 232. The top housing layer 226 includes a front surface 223. The base housing layer 228 includes a back surface 229 facing away from the front surface 223 so that a front surface 227 of the base housing layer 228 is located between a back surface 223 of the top housing layer 226 and the back surface 229. The layer bonding system 230 retains the top housing layer 226 to the base housing layer 228 and defines a plurality of actuator receiving pockets 234 between the top housing layer 226 and the base housing layer 228. The mount system 232 is coupled to the top housing layer 226 so that the housing 220 can be secured to an occupant support (not shown). The occupant-support pulse unit 218 may be positioned over or within a seat back of the occupant support, and/or over or within a seat bottom of the occupant support.

The housing 220 may be formed to include a plurality of apertures 231 positioned so that at least one aperture 231A is located between at least two actuator receiving pockets 234B, 234C of the plurality of actuator receiving pockets 234. Each of the apertures of the plurality of apertures 231 may be located anywhere in the housing outside of plurality of actuator receiving pockets 234. The top housing layer 226 and the base housing layer 228 are each made of flexible materials. In some embodiments, the top housing layer 226 is made of the same flexible material as the base housing layer 228. In other embodiments, the top housing layer 226 is made of a more flexible material than the base housing layer 228. In alternative embodiments, the top housing layer 226 is made of a less flexible material than the base housing layer 228. The flexible material may be a non-woven fabric.

In the illustrative embodiment, the layer bonding system 230 retains the top housing layer 226 to the base housing layer 228 and defines the plurality of actuator receiving pockets 234 with stitching. The stitching between the top housing layer 226 and the base housing layer 228 may be defined by the entire perimeter of both the top housing layer 226 and the base housing layer 228, or the stitching may be defined by at least one portion of the perimeter of both the top housing substrate 226 and the base housing layer 228. In other embodiments, the layer bonding system 230 may retain the top housing layer 226 to the base housing layer 228 and define the plurality of actuator receiving pockets 234 by fusing or gluing the top housing layer 226 to the base housing layer 228. In some embodiments, the layer bonding system 230 may retain the top housing layer 226 to the base housing layer 228 and define the plurality of actuator receiving pockets 234 with a combination of stitching, fusing, or gluing the top housing layer 226 to the base housing layer 228.

The mount system 232 includes a plurality of tabs 236. Each tab of the plurality of tabs 236 extends outwardly away from both the top housing layer 226. The plurality of tabs 236 may secure the housing 220 to the occupant support by use of a fastener (not shown). The fastener may be tape, glue, stitching, one or more straps, one or more zip ties, one or more plastic insert tabs, one or more hog rings, or any combination of fasteners suitable to secure the housing 220 to the occupant support.

Figure 8:
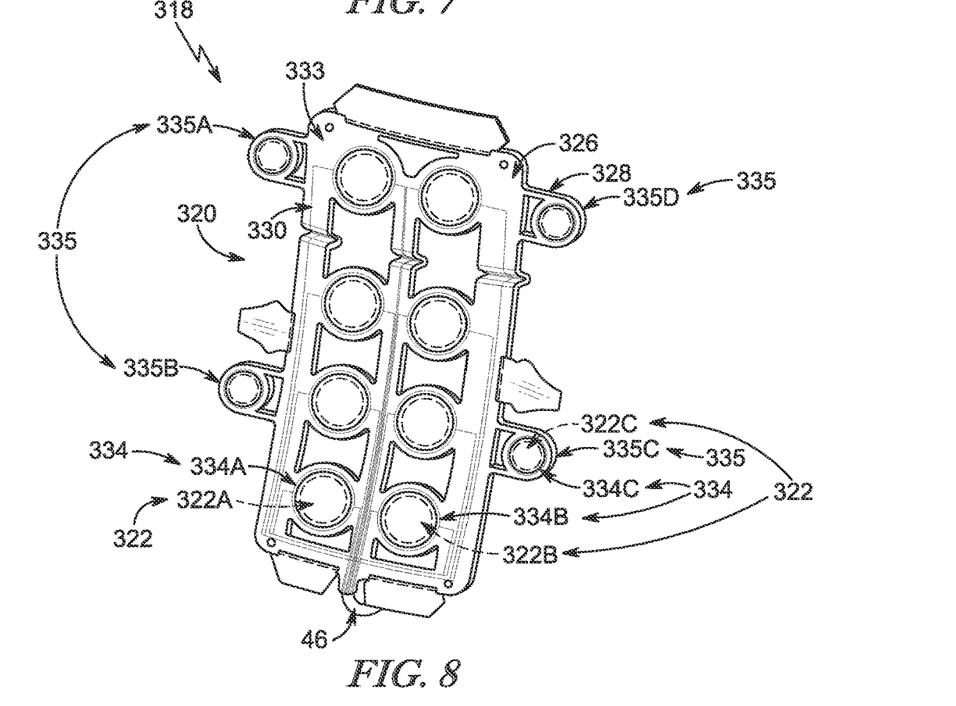
FIG. 8 is a perspective view of a third embodiment of an occupant-support pulse unit showing a housing having a top housing layer, a base housing layer, a layer bonding system defining a plurality of actuator-receiving pockets, a mount system having tabs extending outwardly away from the housing to secure the housing to an occupant support, and a plurality of dielectric actuators arranged to lie between the top housing layer and the base housing layer in a central pulse zone and side pulse zones of the housing.

A third embodiment of an occupant-support pulse unit 318 is shown in FIG. 8. The occupant-support pulse unit 318 is substantially similar to the occupant-support pulse units 18, 218. Accordingly, the disclosures of the occupant-support pulse units 18, 218 are incorporated by reference for the occupant-support pulse unit 318 except for the differences explicitly described below.

The occupant-support pulse unit 318 includes a housing 320 and a plurality of dielectric actuators 322, and an electronic system 24. The housing 320 is configured to receive the plurality of dielectric actuators 322. The electronic system 24 operates the plurality of dielectric actuators 322 to execute the plurality of functions of the occupant-support pulse unit 318.

The occupant-support pulse unit 318 includes a housing 320. The housing 320 includes a central pulse zone 333 and a plurality of side pulse zones 335. The central pulse zone 333 is defined by a top housing layer 326, a bottom housing layer 328, and a layer bonding system 330 and is configured to receive at least two dielectric actuators 322A, 322B of the plurality of dielectric actuators 322 in corresponding actuator receiving pockets 334A, 334B. The plurality of side pulse zones 335 are also defined by the top housing layer 326, the bottom housing layer 328, and the layer bonding system 330. The plurality of side pulse zones 335 extend outwardly away from the central pulse zone 333 and are configured to receive at least one dielectric actuator 332C in a corresponding actuator receiving pocket 334C of at least one side pulse zone 335C.

In the present embodiment, at least one dielectric actuator 322A included in the at least two dielectric actuators positioned in the central pulse zone 333 is designated only for the massage function of the occupant-support pulse unit 318, while at least one dielectric actuator 322B included in the at least two dielectric actuators positioned in the central pulse zone 333 is designated only for the music sync function of the occupant-support pulse unit 318. Similarly, the at least one dielectric actuator 322C positioned in the at least one side pulse zone 335C is designated only for the haptic feedback function of the occupant-support pulse unit 318. In other embodiments, any of the at least two dielectric actuators 322A, 322B positioned in the central pulse zone 333 may be designated for the massage function, the haptic feedback function, and/or the music sync function, while the at least one dielectric actuator 322C positioned in the plurality of side pulse zones 335 may be designated for the massage function, the haptic feedback function, and/or the music sync function.

In some embodiments, the plurality of dielectric actuators 322 may have a first mode in which the at least two dielectric actuators 322A, 322B positioned in the central pulse zone 333 are designated for the massage function, a second mode in which the at least two dielectric actuators 322A, 322B positioned in the central pulse zone 333 are also designated for the music sync function, and a third mode in which the at least one dielectric actuator 322C positioned in the at least one side pulse zone 335C is designated for the haptic feedback function. In other embodiments, each dielectric actuator of the plurality of dielectric actuators 322 may be designated for any combination of the plurality of functions.

Figure 9:
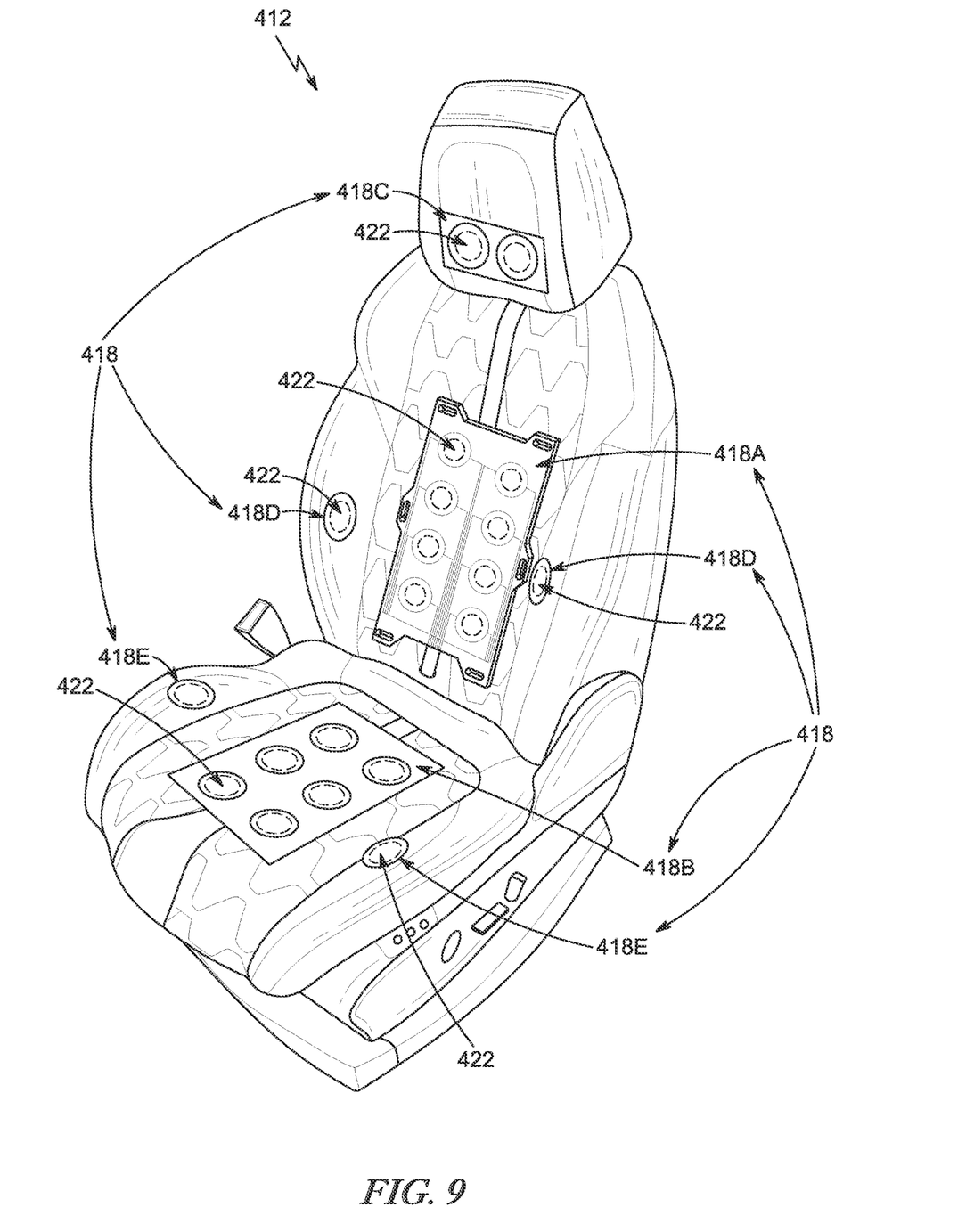
FIG. 9 is a perspective view of another embodiment of the occupant support with portions cutaway to show a fourth embodiment of an occupant-support pulse unit having a seat back unit, a seat bottom unit, a headrest unit, a plurality of wing units, and a plurality of bolster units.

Another embodiment of the occupant support 412 with a fourth embodiment of an occupant-support pulse unit 418 is shown in FIG. 9. The occupant-support pulse unit 418 is substantially similar to the occupant-support pulse units 18, 218, 318. Likewise, the occupant support 412 is substantially similar to the occupant support 12. Accordingly, the disclosure of the occupant-support pulse units 18, 218, 318 and the occupant support 12 are incorporated by reference for the occupant-support pulse unit 418 and the occupant support 412 except for the differences explicitly described below.

The occupant-support pulse unit 418 includes a plurality of units: a seat back unit 418A, a seat bottom unit 418B, a headrest unit 418C, a plurality of wing units 418D, and a plurality of bolster units 418E. The plurality of dielectric actuators 422 contained within each unit 418A, 418B, 418C, 418D, 418E are all connected to a single controller (not shown) which includes a processor and a memory storage device (not shown). The processor executes instructions stored on the memory storage device. The memory storage device of the controller includes instructions that output a command signal to the central wiring harness (not shown) of each unit 418A, 418B, 418C, 418D, 418E in response to an input to cause at least one dielectric actuator of the plurality of dielectric actuators 422 to change to the active state.

Each dielectric actuator of the plurality of dielectric actuators may be designated for the massage function, the haptic feedback function, and/or the music sync function. As an example, each dielectric actuator positioned in the seat back unit 418A and the seat bottom unit 418B may be designated for the massage function. Similarly, each dielectric actuator positioned in the plurality of wing units 418D and the plurality of bolster units 418E may be designated for the haptic feedback function. Finally, each dielectric actuator positioned in the headrest unit 418C may be designated for the music sync function.

The following numbered clauses described embodiments that are contemplated and that are non-limiting.

Clause 1. An occupant support for a vehicle, the occupant support includes a trim cover.

Clause 2. The occupant support of clause 1, any other clause, or any combination or clauses, further including a foam cushion underlying the trim cover.

Clause 3. The occupant support of clause 2, any other clause, or any combination or clauses, further including an occupant-support pulse unit including: a housing positioned between the trim cover and the foam cushion, the housing including a top housing-substrate layer arranged in confronting relation to the trim cover, a base housing-substrate layer arranged in confronting relation to the foam cushion to locate the base housing-substrate layer between the top housing-substrate layer and the foam cushion, and a layer bonding system configured to retain the top housing-substrate layer to the base housing-substrate layer and to define a plurality of actuator-receiving pockets between the top housing-substrate layer and the base housing-substrate layer.

Clause 4. The occupant support of clause 3, any other clause, or any combination or clauses, further including a plurality of actuators positioned between the top housing-substrate layer and the base housing-substrate layer, each dielectric actuator of the plurality of dielectric actuators being received in a corresponding actuator-receiving pocket of the plurality of actuator-receiving pockets, Clause 5. The occupant support of clause 4, any other clause, or any combination or clauses, wherein the plurality of actuators are dielectric actuators.

Clause 6. The occupant support of clause 5, any other clause, or any combination or clauses, wherein each dielectric actuator is changeable between an inactive state in which the dielectric actuator has a first thickness and an active state in which the dielectric actuator expands to a second thickness greater than the first thickness to cause at least a portion of the trim cover to move toward an occupant seated on the occupant support.

Clause 7. The occupant support of clause 1, any other clause, or any combination or clauses, wherein the occupant-support pulse unit further includes an electronic system, the electronic system including a central wiring harness coupled to each dielectric actuator of the plurality of dielectric actuators, a power source configured to provide electricity to the central wiring harness to selectively change each dielectric actuator to the active state, and a controller including a processor and a memory storage device, the memory storage device including instructions stored therein that, when executed by the processor, output a command signal to the central wiring harness in response to an input to cause at least one dielectric actuator to change to the active state.

Clause 8. The occupant support of clause 7, any other clause, or any combination or clauses, wherein the input to the controller includes a massage input, and, in response to the massage input, the controller is configured to change the plurality of dielectric actuators from the inactive state to the active state in a massage mode in which electricity is transferred from the power source to each dielectric actuator through the central wiring harness to cause the plurality of dielectric actuators to change to the active state in a repeated pattern.

Clause 9. The occupant support of clause 8, any other clause, or any combination or clauses, wherein the input to the controller further includes a haptic feedback input, and, in response to the haptic feedback input, the controller is configured to change at least one dielectric actuator from the inactive state to the active state in a haptic feedback mode in which electricity is transferred from the power source to the at least one dielectric actuator through the central wiring harness to cause the at least one dielectric actuator to change to the active state in a second repeated pattern, different than the repeated pattern of the massage mode, in response to a signal provided by a sensor in communication with the controller.

Clause 10. The occupant support of clause 9, any other clause, or any combination or clauses, wherein the controller is an electronic control unit of the vehicle.

Clause 11. The occupant support of clause 9, any other clause, or any combination or clauses, wherein the controller is configured to operate the plurality of dielectric actuators in the haptic feedback mode at the same time as the massage mode such that the plurality of dielectric actuators provide the repeated pattern and the second repeated pattern at the same time.

Clause 12. The occupant support of clause 8, any other clause, or any combination or clauses, wherein the input to the controller further includes a haptic feedback input, and, in response to the haptic feedback input, the controller is configured to change at least one dielectric actuator from the inactive state to the active state in response to a signal provided by an electronic control unit of the vehicle connected to the controller.

Clause 13. The occupant support of clause 8, any other clause, or any combination or clauses, wherein at least one dielectric actuator included in the plurality of dielectric actuators is designated for a massage function, at least one separate dielectric actuator included in the plurality of dielectric actuators is designated for a haptic feedback function, and at least one, additional dielectric actuator included in the plurality of dielectric actuators is designated for a music sync function.

Clause 14. The occupant support of clause 6, any other clause, or any combination or clauses, wherein the housing further includes a mount system coupled to at least one of the top housing-substrate layer and the base housing-substrate layer, the mount system including a plurality of tabs that extend outwardly away from the housing and that are configured to secure the housing to at least one of the trim cover and the foam cushion.

Clause 15. The occupant support of clause 14, any other clause, or any combination or clauses, wherein the mount system is configured to mount the housing and the plurality of dielectric actuators to a seat back of the occupant support and wherein each of the tabs of the plurality of tabs is formed to include an aperture that is configured to receive a fastener to mount the housing to at least one of the trim cover and the foam cushion.

Clause 16. An occupant-support pulse unit for an occupant support, the occupant-support pulse unit includes a housing including a top housing layer having a front surface, a base housing layer having a back surface facing away from the front surface of the top housing layer to locate a front surface of the base housing layer between a back surface of the top housing layer and the back surface of the base housing layer, and a layer bonding system configured to retain the top housing layer to the base housing layer and to define a plurality of actuator-receiving pockets between the top housing layer and the base housing layer.

Clause 17. The occupant-support pulse unit of clause 16, any other clause, or any combination or clauses, further including a plurality of dielectric actuators positioned between the top housing layer and the base housing layer, each dielectric actuator of the plurality of dielectric actuators being received in a corresponding actuator-receiving pocket of the plurality of actuator-receiving pockets.

Clause 18. The occupant-support pulse unit of clause 17, any other clause, or any combination or clauses, wherein each dielectric actuator is changeable between an inactive state in which the dielectric actuator has a first thickness and an active state in which the dielectric actuator expands to a second thickness greater than the first thickness to cause at least a portion of the top housing layer to move toward an occupant seated on the occupant support.

Clause 19. The occupant-support pulse unit of clause 18, any other clause, or any combination or clauses, wherein the housing further includes a mount system coupled to at least one of the top housing layer and the base housing layer, the mount system including at least one tab extending outwardly away from the housing and configured to secure the housing to the occupant support.

Clause 20. The occupant-support pulse unit of clause 19, any other clause, or any combination or clauses, wherein the at least one tab includes an aperture configured to receive a fastener to secure the housing to the occupant support.

Clause 21. The occupant-support pulse unit of clause 16, any other clause, or any combination or clauses, wherein the housing includes a central pulse zone configured to receive at least two dielectric actuators of the plurality of dielectric actuators and at least one side pulse zone configured to receive at least one dielectric actuator of the plurality of dielectric actuators.

Clause 22. The occupant-support pulse unit of clause 21, any other clause, or any combination or clauses, wherein the occupant-support pulse unit further includes an electronic system, the electronic system including a central wiring harness coupled to each dielectric actuator of the plurality of dielectric actuators, a power source configured to provide electricity to the central wiring harness to selectively change each dielectric actuator to the active state, and a controller including a processor and a memory storage device, the memory storage device including instructions stored therein that, when executed by the processor, output a command signal to the central wiring harness in response to an input to cause at least one dielectric actuator to change to the active state.

Clause 23. The occupant-support pulse unit of clause 22, any other clause, or any combination or clauses, wherein the input to the controller includes a massage input, and, in response to the massage input, the controller is configured to change at least one dielectric actuator positioned in the central pulse zone to change from the inactive state to the active state in a massage mode in which electricity is transferred from the power source to the at least one dielectric actuator through the central wiring harness to cause the at least one dielectric actuator to change to the active state in a repeated pattern to provide a massage function to the occupant.

Clause 24. The occupant-support pulse unit of clause 23, any other clause, or any combination or clauses, wherein the input to the controller further includes a haptic feedback input, and, in response to the haptic feedback input, the controller is configured to change the at least one dielectric actuator positioned in the at least one side pulse zone from the inactive state to the active state in a haptic feedback mode in which electricity is transferred from the power source to the at least one dielectric actuator through the central wiring harness to cause the at least one dielectric actuator to change to the active state in a second repeated pattern, different than the repeated pattern of the massage mode, in response to a signal provided by a sensor in communication with the controller.

Clause 25. The occupant-support pulse unit of clause 23, any other clause, or any combination or clauses, wherein the input to the controller further includes a music sync input, and, in response to the music sync input, the controller is figured to change at least one dielectric actuator positioned in the central pulse zone from the inactive state to the active state in a music sync mode in which electricity is transferred from the power source to the at least one dielectric actuator in the central pulse zone to change to the active state in a third repeated pattern, different than the repeated pattern of the massage mode, in coordination with music.

Clause 26. The occupant-support pulse unit of clause 23, any other clause, or any combination or clauses, wherein at least one dielectric actuator included in the at least two dielectric actuators positioned in the central pulse zone is designated for a massage function, the at least one dielectric actuator positioned in the at least one side pulse zone is designated for a haptic feedback function, and at least one, additional dielectric actuator included in the at least two dielectric actuators positioned in the central zone is designated for a music sync function.

Clause 27. The occupant-support pulse unit of clause 26, any other clause, or any combination or clauses, wherein the plurality of dielectric actuators have a first mode in which the at least two dielectric actuators positioned in the central pulse zone provide the massage function, a second mode in which the at least two dielectric actuators positioned in the central pulse zone provide the music sync function, and a third mode in which the at least one dielectric actuator positioned in the at least one side pulse zone provides the haptic feedback function at the same time as the massage function or the music sync function.

The invention claimed is:

1. An occupant support for a vehicle, the occupant support comprising
   a trim cover,
   a foam cushion underlying the trim cover, and
   an occupant-support pulse unit including: (i) a housing positioned between the trim cover and the foam cushion, the housing including a top housing-substrate layer arranged in confronting relation to the trim cover, a base housing-substrate layer arranged in confronting relation to the foam cushion to locate the base housing-substrate layer between the top housing-substrate layer and the foam cushion, and a layer bonding system configured to retain the top housing-substrate layer to the base housing-substrate layer and to define a plurality of actuator-receiving pockets between the top housing-substrate layer and the base housing-substrate layer, and (ii) a plurality of dielectric actuators positioned between the top housing-substrate layer and the base housing-substrate layer, each dielectric actuator of the plurality of dielectric actuators being received in a corresponding actuator-receiving pocket of the plurality of actuator-receiving pockets,
   wherein each dielectric actuator is changeable between an inactive state in which the dielectric actuator has a first thickness and an active state in which the dielectric actuator expands to a second thickness greater than the first thickness to cause at least a portion of the trim cover to move toward an occupant seated on the occupant support.

2. The occupant support of claim 1, wherein the occupant-support pulse unit further includes an electronic system, the electronic system including a central wiring harness coupled to each dielectric actuator of the plurality of dielectric actuators, a power source configured to provide electricity to the central wiring harness to selectively change each dielectric actuator to the active state, and a controller including a processor and a memory storage device, the memory storage device including instructions stored therein that, when executed by the processor, output a command signal to the central wiring harness in response to an input to cause at least one dielectric actuator to change to the active state.

3. The occupant support of claim 2, wherein the input to the controller includes a massage input, and, in response to the massage input, the controller is configured to change the plurality of dielectric actuators from the inactive state to the active state in a massage mode in which electricity is transferred from the power source to each dielectric actuator through the central wiring harness to cause the plurality of dielectric actuators to change to the active state in a repeated pattern.

4. The occupant support of claim 3, wherein the input to the controller further includes a haptic feedback input, and, in response to the haptic feedback input, the controller is configured to change at least one dielectric actuator from the inactive state to the active state in response to a signal provided by an electronic control unit of the vehicle connected to the controller.

5. The occupant support of claim 3, wherein at least one dielectric actuator included in the plurality of dielectric actuators is designated for a massage function, at least one separate dielectric actuator included in the plurality of dielectric actuators is designated for a haptic feedback function, and at least one, additional dielectric actuator included in the plurality of dielectric actuators is designated for a music sync function.

6. The occupant support of claim 3, wherein the input to the controller further includes a haptic feedback input, and, in response to the haptic feedback input, the controller is configured to change at least one dielectric actuator from the inactive state to the active state in a haptic feedback mode in which electricity is transferred from the power source to the at least one dielectric actuator through the central wiring harness to cause the at least one dielectric actuator to change to the active state in a second repeated pattern, different than the repeated pattern of the massage mode, in response to a signal provided by a sensor in communication with the controller.

7. The occupant support of claim 6, wherein the controller is an electronic control unit of the vehicle.

8. The occupant support of claim 6, wherein the controller is configured to operate the plurality of dielectric actuators in the haptic feedback mode at the same time as the massage mode such that the plurality of dielectric actuators provide the repeated pattern and the second repeated pattern at the same time.

9. The occupant support of claim 1, wherein the housing further includes a mount system coupled to at least one of the top housing-substrate layer and the base housing-substrate layer, the mount system including a plurality of tabs that extend outwardly away from the housing and that are configured to secure the housing to at least one of the trim cover and the foam cushion.

10. The occupant support of claim 9, wherein the mount system is configured to mount the housing and the plurality of dielectric actuators to a seat back of the occupant support and wherein each of the tabs of the plurality of tabs is formed to include an aperture that is configured to receive a fastener to mount the housing to at least one of the trim cover and the foam cushion.

11. An occupant-support pulse unit for an occupant support, the occupant-support pulse unit comprising
   a housing including a top housing layer having a front surface, a base housing layer having a back surface facing away from the front surface of the top housing layer to locate a front surface of the base housing layer between a back surface of the top housing layer and the back surface of the base housing layer, and a layer bonding system configured to retain the top housing layer to the base housing layer and to define a plurality of actuator-receiving pockets between the top housing layer and the base housing layer, and
   a plurality of dielectric actuators positioned between the top housing layer and the base housing layer, each dielectric actuator of the plurality of dielectric actuators being received in a corresponding actuator-receiving pocket of the plurality of actuator-receiving pockets,
   wherein each dielectric actuator is changeable between an inactive state in which the dielectric actuator has a first thickness and an active state in which the dielectric actuator expands to a second thickness greater than the first thickness to cause at least a portion of the top housing layer to move toward an occupant seated on the occupant support, and
   wherein the housing further includes a mount system coupled to at least one of the top housing layer and the base housing layer, the mount system including at least one tab extending outwardly away from the housing and configured to secure the housing to the occupant support.

12. The occupant-support pulse unit of claim 11, wherein the housing includes a central pulse zone configured to receive at least two dielectric actuators of the plurality of dielectric actuators and at least one side pulse zone configured to receive at least one dielectric actuator of the plurality of dielectric actuators.

13. The occupant-support pulse unit of claim 11, wherein the at least one tab includes an aperture configured to receive a fastener to secure the housing to the occupant support.

14. The occupant-support pulse unit of claim 13, wherein the occupant-support pulse unit further includes an electronic system, the electronic system including a central wiring harness coupled to each dielectric actuator of the plurality of dielectric actuators, a power source configured to provide electricity to the central wiring harness to selectively change each dielectric actuator to the active state, and a controller including a processor and a memory storage device, the memory storage device including instructions stored therein that, when executed by the processor, output a command signal to the central wiring harness in response to an input to cause at least one dielectric actuator to change to the active state.

15. The occupant-support pulse unit of claim 14, wherein the input to the controller includes a massage input, and, in response to the massage input, the controller is configured to change at least one dielectric actuator from the inactive state to the active state in a massage mode in which electricity is transferred from the power source to the at least one dielectric actuator through the central wiring harness to cause the at least one dielectric actuator to change to the active state in a repeated pattern to provide a massage function to the occupant.

16. The occupant-support pulse unit of claim 15, wherein the input to the controller further includes a music sync input, and, in response to the music sync input, the controller is figured to change at least one dielectric actuator from the inactive state to the active state in a music sync mode in which electricity is transferred from the power source to the at least one dielectric actuator to change the at least one dielectric actuator to the active state in a third repeated pattern, different than the repeated pattern of the massage mode, in coordination with music.

17. The occupant-support pulse unit of claim 15, wherein the input to the controller further includes a haptic feedback input, and, in response to the haptic feedback input, the controller is configured to change the at least one dielectric actuator from the inactive state to the active state in a haptic feedback mode in which electricity is transferred from the power source to the at least one dielectric actuator through the central wiring harness to cause the at least one dielectric actuator to change to the active state in a second repeated pattern, different than the repeated pattern of the massage mode, in response to a signal provided by a sensor in communication with the controller.

18. The occupant-support pulse unit of claim 15, wherein at least one dielectric actuator is designated for a massage function, at least one dielectric actuator is designated for a haptic feedback function, and at least one dielectric actuator is designated for a music sync function.

19. The occupant support of claim 18, wherein the plurality of dielectric actuators have a first mode in which at least two dielectric actuators provide the massage function, a second mode in which the at least two dielectric actuators provide the music sync function, and a third mode in which the at least two dielectric actuators provide the haptic feedback function at the same time as the massage function or the music sync function.

* * * * *